Figure 1:
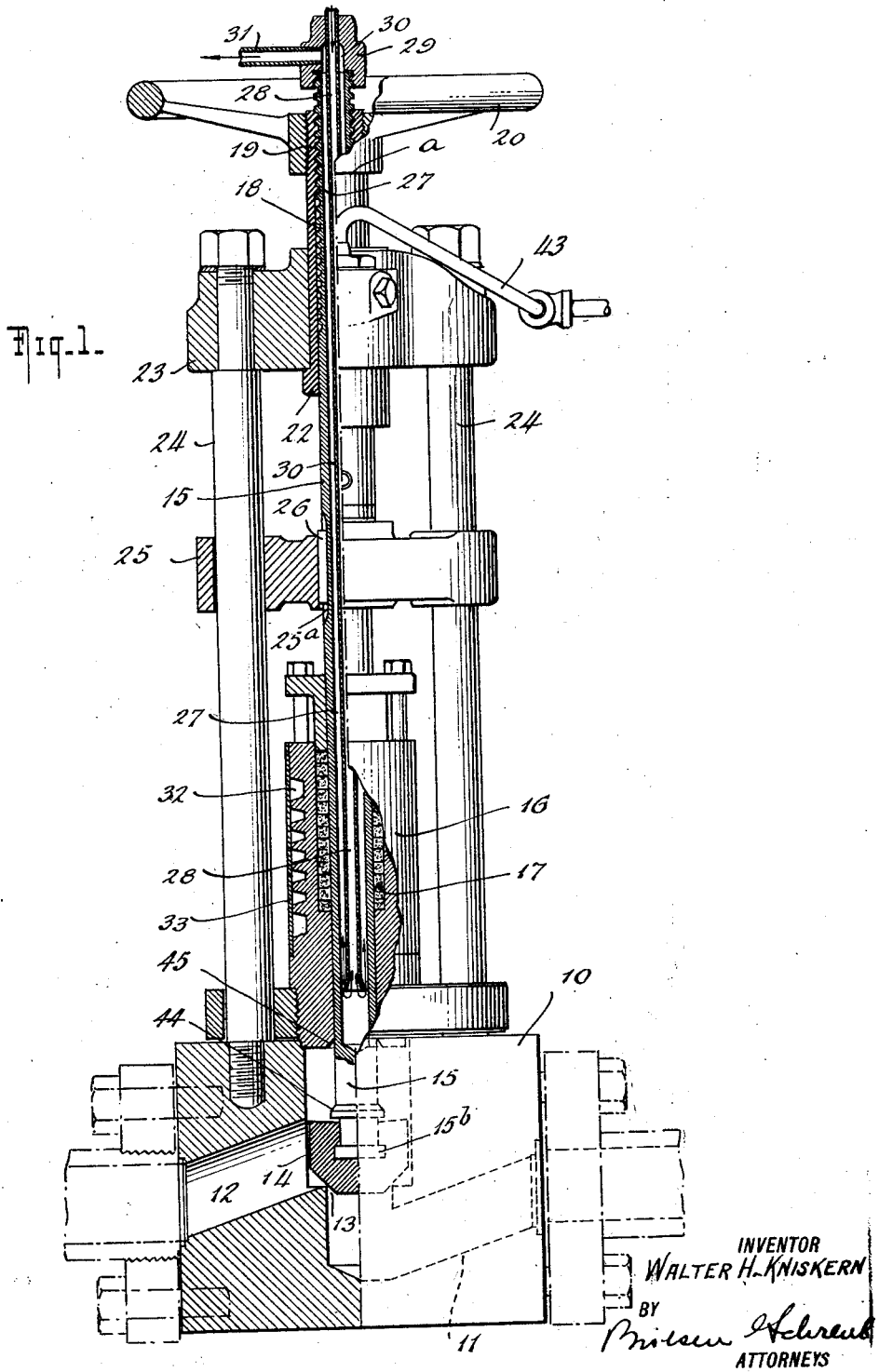

Feb. 7, 1928.

W. H. KNISKERN

VALVE

Filed Sept. 10, 1923

1,658,292

2 Sheets-Sheet 1

INVENTOR
WALTER H. KNISKERN
BY
ATTORNEYS

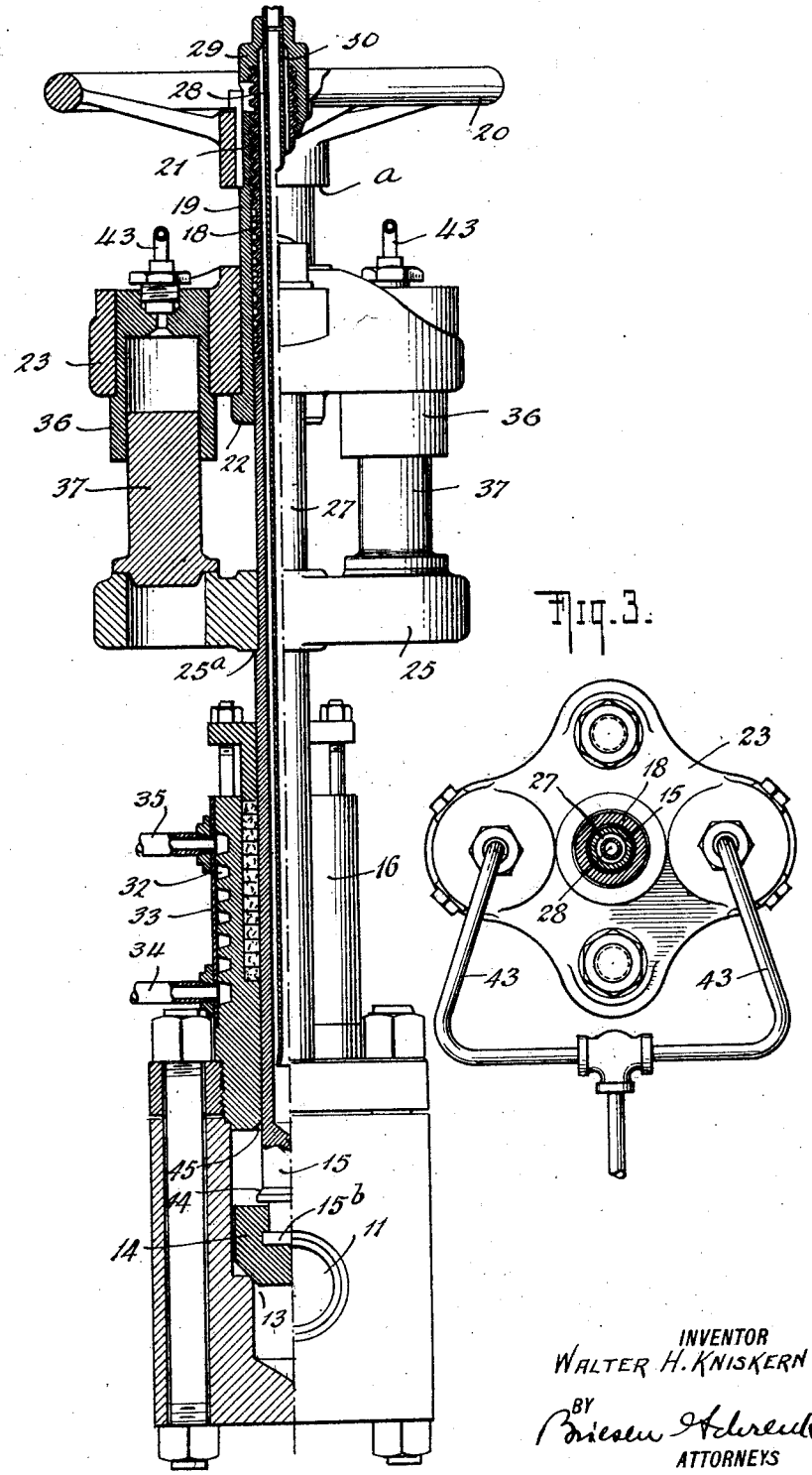

Patented Feb. 7, 1928.

1,658,292

UNITED STATES PATENT OFFICE.

WALTER H. KNISKERN, OF SYRACUSE, NEW YORK, ASSIGNOR TO ATMOSPHERIC NITROGEN CORPORATION, OF SOLVAY, NEW YORK, A CORPORATION OF NEW YORK.

VALVE.

Application filed September 10, 1923. Serial No. 661,799.

My invention relates to valves and more particularly to that type known as high pressure valves adapted for the control of fluids under high pressures and temperatures and has for its object to provide a novel construction and arrangement of valves of maximum simplicity and efficiency. Other more specific objects will appear from the description hereinafter.

In the accompanying drawings which illustrate examples of the invention without defining its limits, Fig. 1 is a sectional elevation of a valve constructed according to the invention in a form adapted specifically for the control of hot fluids; Fig. 2 is a similar view looking in a direction at right angles to Fig. 1; and Fig. 3 is a plan view.

As shown in the drawings, the valve comprises a body 10 having two passages 11 and 12 between which a valve seat 13 is located. Either passage 11 or 12 may be used as the inlet and the other for the outlet although in the preferred form 11 is the inlet and 12 the outlet. It will be manifest from the drawings that the valve block 10 is a massive body within which the passages 11 and 12 and the valve seat 13 are so disposed that the strength of the said massive body resists deformation and fracture of all parts of the body under the influence of high pressure and prevailing thermal conditions. In other words, there is an entire absence of any thin walls, partitions, projections, or other weak parts such as are common in ordinary globe valves and the like, and the whole of the valve block in every part thereof is of a massive pressure-resisting character.

The valve seat 13 co-operates with a solid valve plug 14 which may be rigidly united or be integral with the valve stem 15 (as indicated in Fig. 4) but which is preferably loosely mounted upon the lower end of the valve stem 15, for instance as shown in Fig. 1. The valve stem 15 passes through a stuffing box 16 and through a suitable packing 17 located in said stuffing box. The stuffing box is rigidly secured to the massive body (see Fig. 2) by a screw-threaded connection with a plate which is in turn bolted to the massive body. At its upper end the valve stem is externally screwthreaded as indicated at 18 for the accommodation of an internally screwthreaded sleeve 19. The latter at its upper end is provided with a hand wheel 20 fixed upon the sleeve in any suitable manner as by means of a key 21 and at its lower end is provided with an annular shoulder 22 adapted to engage the header 23 mounted upon the upright rods 24 which are rigidly fixed upon and extend upwardly from the massive body 10. A yoke 25 seated on the shoulder 25ª of the valve stem 15, in sliding engagement with the rods 24 is connected with the valve stem 15 by means of a key and keyways 26; in addition to its other functions to be set forth more fully hereinafter, the yoke through the medium of the key and keyway 26 and the rods 24, prevents rotation of the valve stem 15. The packing material 17, it will be observed, is situated within a relatively high thermal zone of the valve and of the massive body 10, and, by reason of its situation in this zone, is subject to deterioration on exposure, in the absence of auxiliary cooling influences, to the heat transmitted from the hot fluids passing through the valve. The packing material 17 is positioned (Figs. 1 and 2) between an inner wall of the stuffing box 16 and an outer wall of the valve stem 15 and forms a gas-tight joint against the high pressure fluids in the valve.

For cooling purposes the valve stem is provided with an axial bore 27 into which a tube 28 projects, said tube being mounted by means of a fixture 29 upon the upper end of the valve stem 15 and projecting beyond the same for connection with a source of cooling medium such as cool water, air or the like. The tube 28 is of less diameter than the diameter of the bore 27 and its periphery is spaced from the inner walls of the valve stem (i. e. the walls of the bore 27) in the region of the packing material. The tube terminates at a distance from the inner end of the bore 27 and the innermost point of the bore 27 and of the tube 28 are both situated within the valve stem at a point thereof intermediate with respect to the valve plug on the one hand and the packing material on the other, whereby a passage is formed which is adapted to convey the cooling fluid past the packing material first in one direction and then in an opposite direction. The tube 28 forms an annular space 30 within the valve stem 15 which space is connected with an exit pipe 31. The inlet end of tube 28 and the outlet 31 of the reverse passage 30 are both situated in a lower thermal zone than that which affects the packing material 17. In consequence of this arrangement the cooling fluid first travels in the direction of the longitudinal extent of the packing material and then via the opening of the tube 28, flows in a reversed direction to the outlet of the cooling fluid passage so that the travel of the cooling fluid through its passage extends from and to a lower thermal zone than that which affects the packing material. For still further increasing the cooling action the stuffing box 16 may be provided upon its exterior with a helical or spiral passage 32 covered by means of a shell 33 and connected with an inlet pipe 34 and an outlet pipe 35 whereby a cooling medium such as cool water, air, or the like, may be circulated through the passage 32.

In practice, to close the valve by hand the hand wheel 20, which is located in a relatively cool zone with respect to the valve body is rotated in the proper direction to rotatably actuate the sleeve 19 in a manner to lower the stem 15 and with it the valve plug 14 toward the seat 13; the tendency of the sleeve 19 to move upwardly during this actuation of the hand wheel is overcome by the co-operation of the annular shoulder 22 with the header 23. To open the valve the hand wheel 20 is rotated in the reverse direction. If there is no pressure in 11 then the wheel 20 requires rotation until the bearing surface $a$ thereof engages the header 23 whereupon a continued rotation of the hand wheel 20 will cause an elevation of the valve stem 15 and an unseating of the plug 14 from its seat 13. It will be understood that the sleeve 19 moves relatively to and downwardly upon the stem 15 until the surface $a$ of the hand wheel 20 engages the header 23 after which such further relative downward movement of the sleeve is prevented with the result that the stem and valve plug are raised in the manner previously set forth. The valve plug is capable of being placed most efficiently upon the seat 13 so as to make an absolutely fluid-tight contact. In the preferred arrangement the valve plug 14 is made of chrome-vanadium steel.

While the valve is in use a cooling medium such as cool water is passed through the stem 15 to cool the valve stem, said cooling medium being introduced either through tube 28, or pipe 31. The drawing shows the cooling water as passing down in tube 28, then upwardly in the space 30 and out through pipe 31. At the same time a cooling medium, such as cool water, is caused to flow through the passage 32 exteriorly of the stuffing box 16 and out through the pipe 35 to maintain the stuffing box in a cool condition. Because of this cooling arrangement, not only are the moving parts cooled to permit easy operation in opening and closing, but the tendency to stick due to the expansion of the stem and stuffing box by heat is entirely overcome. A further and important advantage is that by the action of the cooling medium passing lengthwise of the stem 15, the latter, at the point where the packing 17 is located, no longer retains the high heat acquired at the plug portion 14; in addition an outer cooling is effective upon the packing by reason of the cooling medium which flows through the passage 32 and consequently the rate of deterioration of packing 17 is greatly reduced, thus extending its life and utility.

In order to permit the valve to be closed hydraulically the header 23 may be provided with diametrically opposite cylinders 36 in which hydraulic rams 37 are vertically slidable.

The cylinders 36 are connected by means of pipes 43 with a source of hydraulic power, suitable controlling devices being included in the system in the well known way.

In closing the valve hydraulically, the liquid enters through the pipes 43 into the cylinders 36 and forces the rams 37 against the yoke 25. This causes the latter to descend and closes the valve practically instantaneously from any distance. The valve is automatically opened by the pressure within the system as soon as the pressure of the liquid above the rams 37 in the cylinders 36 is released, care being taken, of course, to see that the hand wheel 20 is first in such a position that the annular shoulder 22 of the sleeve 19 is not in engagement with the header 23.

In the valve, as shown in the drawings, the high pressure of the fluid, which enters through the inlet passage 11 is exerted upon the valve plug 14 in the direction of opening of the valve and accordingly tends to force the interior surface of the plug into engagement with the end face of the stem 15 at the part $15^b$. The high pressure of the incoming fluid is effective upon the plug 14 when opening the valve and also when closing the same and maintains the same in continuous contact with the opposed contiguous end of the stem during both the seating and unseating periods. The valve plug 14 is thus, at all times during such periods, under direct, positive, mechanical control, effective at the moments of seating and unseating of said valve.

The valve stem 15 is preferably provided with an annular shoulder 44 adapted to engage an annular seat 45 at the inner end of the stuffing box 16 when the valve is fully opened; through the co-operation of the shoulder 44 and seat 45 a fluid tight connection is effected between the stuffing box and the valve stem in the fully open position of the valve, thus permitting repacking of the valve while the latter is in operation.

The valve is of simple and novel construction and adapted to control efficiently the flow of fluids under high pressure and is operated in a simple manner and with a minimum of effort.

Various changes in the specific form shown and described may be made within the scope of the claims without departing from the spirit of my invention.

I claim:

1. A valve for high pressure systems for the control of the flow of high temperature fluids therein, comprising a massive body, a passage for fluids through the same, a valve seat in the passage, said passage and seat being so disposed within the massive body that the strength of the latter resists deformation and fracture of all parts of the body under the influence of high pressure and prevailing thermal conditions, a solid valve plug, a valve stem for the said plug, means to control the movement of said stem and plug toward and from said valve seat, a stuffing box for the valve stem rigidly secured to the massive body, packing material situated within a relatively high thermal zone of the valve and, by reason of said situation, being subject to deterioration on exposure, in the absence of auxiliary cooling influences, to the heat transmitted from the hot fluids passing through the valve, said packing material being positioned between an inner wall of the stuffing box and the outer wall of the valve stem forming a gas-tight joint against the high pressure fluids in the valve, and a passage for cooling fluid within the valve stem having an inlet and an outlet to and from the interior of the valve stem and adapted to convey the cooling fluid past the packing material first in one direction and then in the opposite direction from and to a lower thermal zone than that affecting the packing material.

2. A valve for high pressure systems for the control of the flow of high temperature fluids therein, comprising a massive body, a passage for fluids through the same, a valve seat in the passage, said passage and seat being so disposed within the massive body that the strength of the latter resists deformation and fracture of all parts of the body under the influence of high pressure and prevailing thermal conditions, a solid valve plug, a valve stem for the said plug, a connection between the valve stem and plug which provides a loose engagement therebetween, means to control the movement of said stem and plug toward and from said valve seat, a stuffing box for the valve stem rigidly secured to the massive body, packing material situated within a relatively high thermal zone of the valve and, by reason of said situation, being subject to deterioration on exposure, in the absence of auxiliary cooling influences, to the heat transmitted from the hot fluids passing through the valve, said packing material being positioned between an inner wall of the stuffing box and the outer wall of the valve stem forming a gas-tight joint against the high pressure fluids in the valve, and a passage for cooling fluid within the valve stem having an inlet and an outlet to and from the interior of the valve stem, the innermost portion of said passage terminating within the valve stem at a point thereof intermediate with respect to the valve plug on the one hand and the packing material on the other, said passage being further adapted to convey the cooling fluid past the packing material first in one direction and then in the opposite direction from and to a lower thermal zone than that affecting the packing material.

3. A valve such as described in claim 1 in which the stuffing box is provided with a passage for a circulating cooling medium, said passage being located exteriorly of the packing and within effective heat abstracting range of the stuffing box surface which contacts with the packing.

4. A valve such as described in claim 1 in which the stuffing box is provided with a spiral passage for a circulating cooling medium, said passage being located exteriorly of the packing and within effective heat abstracting range of the stuffing box surface which contacts with the packing.

5. A valve such as described in claim 1, in which the passage for cooling fluid in the valve stem comprises a longitudinal tube located in a hollow bore in the valve stem and extending from a point ahead of the packing material to a point beyond the packing material and having an opening in said latter region, the periphery of said tube being spaced from the inner walls of the valve stem in the region of the packing material, whereby the cooling fluid first travels in the direction of the longitudinal extent of the packing material and then, via the opening of the tube, flows in a reverse direction to the outlet.

6. A valve for high pressure systems for the control of the flow of high temperature fluids therein, comprising a massive body, a passage for fluids through the same, a valve seat in the passage, said passage and seat being so disposed within the massive body that the strength of the latter resists deformation and fracture of all parts of the body under the influence of high pressure and prevailing thermal conditions, a solid valve plug, a valve stem for the said plug, means for effecting movement of the valve stem and its associated valve plug by power operated control and also by means independent of the power control and operable by a manually controlled member, said member being located in a relatively cool zone with respect to the valve body, a stuffing box for the valve stem rigidly secured to the massive body, packing material situated within a relatively high thermal zone of the valve and, by reason of said situation, being subject to deterioration on exposure, in the absence of auxiliary cooling influences, to the heat transmitted from the hot fluids passing through the valve, said packing material being positioned between an inner wall of the stuffing box and the outer wall of the valve stem forming a gas-tight joint against the high pressure fluids in the valve, and a passage for cooling fluid within the valve stem having an inlet and an outlet to and from the interior of the valve stem and adapted to convey the cooling fluid past the packing material first in one direction and then in the opposite direction from and to a lower thermal zone than that affecting the packing material.

In testimony whereof I have hereunto set my hand.

WALTER H. KNISKERN.